United States Patent [19]

Shiota

[11] Patent Number: 4,903,068
[45] Date of Patent: Feb. 20, 1990

[54] PHOTOGRAPHIC PRINTER
[75] Inventor: Kazuo Shiota, Kanagawa, Japan
[73] Assignee: Fuji Photo Film Co., Ltd., Kanagawa, Japan
[21] Appl. No.: 215,146
[22] Filed: Jul. 5, 1988
[30] Foreign Application Priority Data Jul. 3, 1987 [JP] Japan .................. 62-167533

[51] Int. Cl.[4] .............................. G03B 27/80
[52] U.S. Cl. ......................... 355/20; 355/40; 355/68; 355/38; 358/80
[58] Field of Search ............ 355/38, 68, 77, 20, 355/40; 358/76, 80; 346/110 R

[56] References Cited

U.S. PATENT DOCUMENTS 4,364,084  12/1982  Akimoto et al. .................. 358/76
4,531,150  7/1985   Amano ............................. 358/76
4,693,596  9/1987   Shigaki ......................... 355/38 X

FOREIGN PATENT DOCUMENTS 61-122639  6/1986  Japan .......................... 27/32

Primary Examiner—L. T. Hix
Assistant Examiner—D. Rutledge
Attorney, Agent, or Firm—Sughrue, Mion, Zinn, Macpeak & Seas

[57] ABSTRACT

A photographic printer has a black-and-white CRT which is used as a light source for illuminating an original film with a flying light spot when making a print of a frame of the original film in a three color frame sequential exposure. While making prints of the respective frames of the original film, image signals are stored in a memory by color on a frame by frame basis. The image signals are read out from the memory after every predetermined number of frames, and are electrically processed to provide composite video image signals which are displayed on a CRT as an inlaid composite video image of the predetermined number of frames to which a photographic paper is exposed. A mirror, which may be either a half or a full mirror, is provided to reflect the flying spot light passed through the original film to a light detecting device from which output signals are transmitted to the memory.

11 Claims, 3 Drawing Sheets

PHOTOGRAPHIC PRINTER

BACKGROUND OF THE INVENTION

The present invention relates to a photographic printer which selectively can make a print from a photographic film and a video image.

Index prints, each including a reduced size of image on frames of a roll of negative film, have been used for demonstrating the contents of the negative film. One such index print is disclosed in Japanese Unexamined Patent Publication No. 61-122,639. For making such an index print, a roll of negative film is divided into a plurality of film strips. The film strips are placed in a negative carrier in the order in which the film strips are arranged in a negative holder. These film strips are pressed down by a framing mask and are illuminated from the back so that they are projected onto a photographic paper by a printing lens. In the index print, one frame number is printed for each positive image reduced in size.

It has been necessary to use an extra printer for making such index prints in addition to using a printer for making enlarged prints of respective frames of a negative film. Having to use two printers has made it quite troublesome to make enlarged prints and index prints.

SUMMARY OF THE INVENTION

In view of the foregoing deficiencies, it is an object of the present invention to provide a photographic printer which can easily make index print as well as enlarged prints from a film.

To accomplish the foregoing and other objects, the printer according to the present invention has a CRT which is used as a light source for illuminating an original to be printed with a flying light spot, a mirror for directing part of the flying light spot passed through the original toward a light detecting device for providing video signals for a frame of the original, memory means for memorizing video signals as inlaid composite video signals and means for displaying the composite video signals as a composite image on a CRT.

According to the present invention, while an original such as a negative film is scanned with a flying light spot of the CRT and is projected onto a photographic paper for making an enlarged print of a frame of the original, a part of the light spot passed through the original is detected by a light detecting device such as a photomultiplier to provide image signals of the frame. Image signals are stored as video signals in a frame memory on a frame by frame basis so as to be electrically composed. When an index print is needed, the original is removed and the composite video signals are displayed on the CRT as a composite image to which the photographic paper is exposed.

Because video images of frames of the original can be provided and electrically composed while making prints of the frames, an index print of images including the printed frames can be made at any time following the print of the frames. Thus, making an index print becomes easy. Furthermore, because the use of an extra printer for making index prints is eliminated, the index prints may be provided at a low printing cost.

BRIEF DESCRIPTION OF THE DRAWINGS

The present invention now will be described in detail with reference to the accompanying drawings, in which.

DETAILED DESCRIPTION OF A PREFERRED EMBODIMENT

Figure 1:
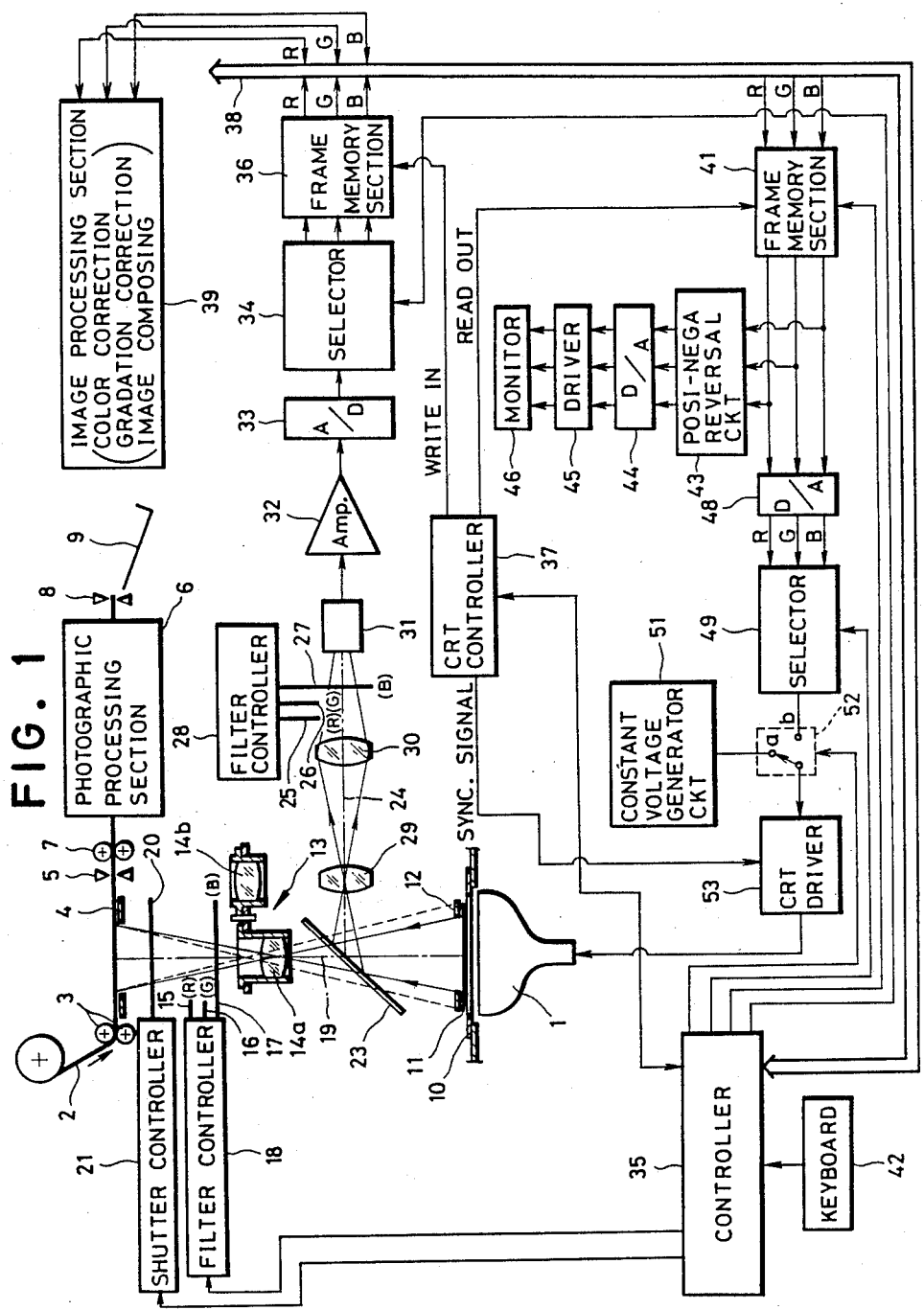
FIG. 1 is a schematic block diagram showing a photographic printer according to a preferred embodiment of the present invention.

FIG. 1 shows a photographic printer according to a preferred embodiment of the present invention. Above a black-and-white CRT 1, there is a photosensitive material such as a color photographic paper 2 in the form of a roll which is withdrawn by means of a pair of rollers 3 to be placed in an exposure position defined by a framing mask 4. After the exposure of a predetermined number of frames the exposed photographic paper 2 is cut off in single strips by a cutter 5 and the strips are sent to a photographic processing section 6. In the photographic processing section 6, each single strip of exposed photographic paper 2 is processed appropriately, and then is cut into individual prints by a cutter 8. These prints are delivered to an external tray 9.

In the photographic printer, the black-and-white CRT 1 is used as a light source to illuminate an original film such as a color negative film 11. This black-and-white CRT 1 is of a high luminance and short persistence of CRT and scans its phosphor screen with a flying spot to form a raster. When making a print from the color negative film 11, the white light spot emanating from the black-and-white CRT 1 reaches the color negative film 11 which is held between a film carrier 10 and a masking frame 12. This masking frame 12 is actuated by a solenoid (not shown) to press down the color negative film 11 on the film carrier 10. The film carrier 10 and masking frame 12 are removed when a video image displayed on the black-and-white CRT 1 is printed. It will be understood that prints can be made from a color reversal film by using a color reversal photographic paper and a developer for the color reversal photographic paper.

Between the black-and-white CRT 1 and the color photographic paper 2, there is a lens turret 13 provided with a film printing lens 14a and a video image printing lens 14b, either one of which is selectively inserted into the printing path 19. Above the lens turret 13 there are three color filters, namely red (R). green (G) and blue (B) filters 15. 16 and 17, respectively, which are driven by a filter controller 18, each color filter being insertable into the printing path 19 independently of the other two so as to make a print of a negative film 11 or a video image in a three color frame sequential exposure.

A shutter 20 is disposed between the lens turret 13 and the masking frame 4, and is controlled by a shutter controller 21 to open and close three times, once for each color, for every exposure. Also, it will be understood that the color filters 15 to 17 may be replaced with complementary color filters, namely cyan, magenta and yellow filters, when making prints in a subtractive color printing. In subtractive color printing, the shutter 21 may be controlled to open and close once every frame.

Between the black-and-white CRT 1 and the lens turret 13, there is a half mirror 23 which is disposed at an angle of 45° with respect to the printing path 19 to reflect and direct a part of the light from the black-and-white CRT 1 toward a video image exposure system which will be described in detail later. In place of such a half mirror 23, a full-reflection mirror may be provided which would be removably inserted into the printing path 19.

The portion of the light reflected by the half mirror 23 is focused on a photomultiplier tube 31 through a focusing lens 29 and a condenser lens 30 disposed in an image taking path 24. In the image taking path 24 there also are disposed three primary color filters, namely red (R), green (G) and blue (B) filters 25 26 and 27 for light measurement. Each color filter 25, 26, 27 is controllably insertable into the image taking path independently of the other two under the control of a filter controller 28 when measuring the color negative film 11 to detect three color components of light passed through the color negative film 11.

The photomultiplier tube 31 photoelectrically transfers the light passed through the color negative film 11 scanned with a flying light spot. Since the output from the photomultiplier 31 is weak, an amplifier 32 is provided to amplify the output. The amplified output is sent to an A/D converter 33 for analog-to-digital conversion.

A frame memory section 36 comprises three frame memories, one for each color, to store therein image signals selected by a selector 34. A CRT controller 37 provides a CRT driver 53 for the black-and-white CRT 1 with synchronizing signals, and also provides the frame memory section 36 with address signals corresponding to scanning points of a raster when printing a color negative film. Under the presence of address signals, the frame memory section 36 writes image signals therein. After writing in the image signals for the three colors, the image signals are read out from the frame memory section 36 and are sent to an image processing section 39 through a bus line 38 for gradation, color correction, and image reduction which is performed by thinning image signals. The processed image signals then are written in designated areas of a frame memory section 41 addressed by the controller 35 through the bus line 38. At this time, the controller 35 writes in data on frame numbers of respective frames in the frame memory section 41.

Image signals read out from the frame memory section 41 are sent to both a monitoring system and a film printing system. This monitoring system comprises a negative to positive reversal circuit 43, an A/D converter 44, a monitor driver 45 and a color monitor such as a color CRT 46 driven by he monitor driver 45. On the color CRT 46, a video image to be printed is displayed as a color positive image. On the other hand, the film printing system comprises a D/A converter 48, a selector 49 controlled by the controller 35 to selectively transfer three color image signals, a changeover switch 52 in association with a constant voltage generator 51, and a CRT driver 53. The changeover switch 52 is controlled by the controller 35 to selectively connect one of the selector 49 and the constant voltage generator 51 to the CRT driver 53. In particular, the changeover switch 52 connects the CRT driver 53 to the constant voltage generator 51 through a contact "a" when printing a negative film and, on the other hand, to the selector 49 through a contact "b" when printing a video image. It is to be noted that, when printing a color reversal film, a positive-to-negative reversal is effected in the image processing section 39.

A keyboard 42, including a power switching key, a printing key, a video image printing key, an index print format selection key, and so forth, enters necessary instructions into the controller 35. The controller 35 performs a programmed sequence of operations for controlling the image processing section 39, the CRT controller 37, the filter controllers 18 and 28, the shutter controller 21, the selectors S4 and 49, the lens turret 13, etc.

Figure 2:
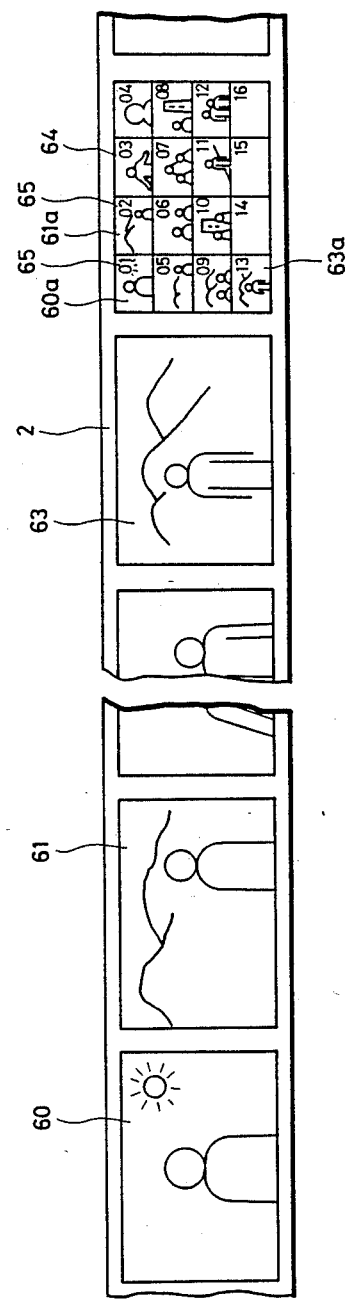
FIG. 2 is an illustration showing a photographic paper on which frames of a negative film and a composite video image of the frames are printed.

FIG. 2 shows an exposed color photographic paper 2 on which latent images 60, 61, 63 and 64, which are depicted in solid outline for ease of understanding. The first three images are formed to expose the color photographic paper 2 to the respective frames of the color negative film 11 which is illuminated by a flying spot for scanning the phosphor screen of the black-and-white CRT 1. The image 64 is printed by exposing the color photographic paper 2 to the black-and-white CRT on which a number of frames of the color negative film 11 are displayed as an electrically composed image. Frames 60a, 61a and 63a are reduced in size from the numerically corresponding frames 60, 61, and 63. Frames such as 60a, 61a, and 63a are inlaid in a single composite image frame 64 as an index print, and are arranged in a 4×4 matrix. Therefore, two index prints are provided for a 24-exposure roll of film, and three index prints are provided for a 36-exposure roll of film. Alternatively, it is possible to indicate various matrices such as a 4×4 matrix for a 12-exposure roll of film, a 5×5 matrix for a 24-exposure roll of film, and a 6×6 matrix for a 36-exposure roll of film.

Figure 3:
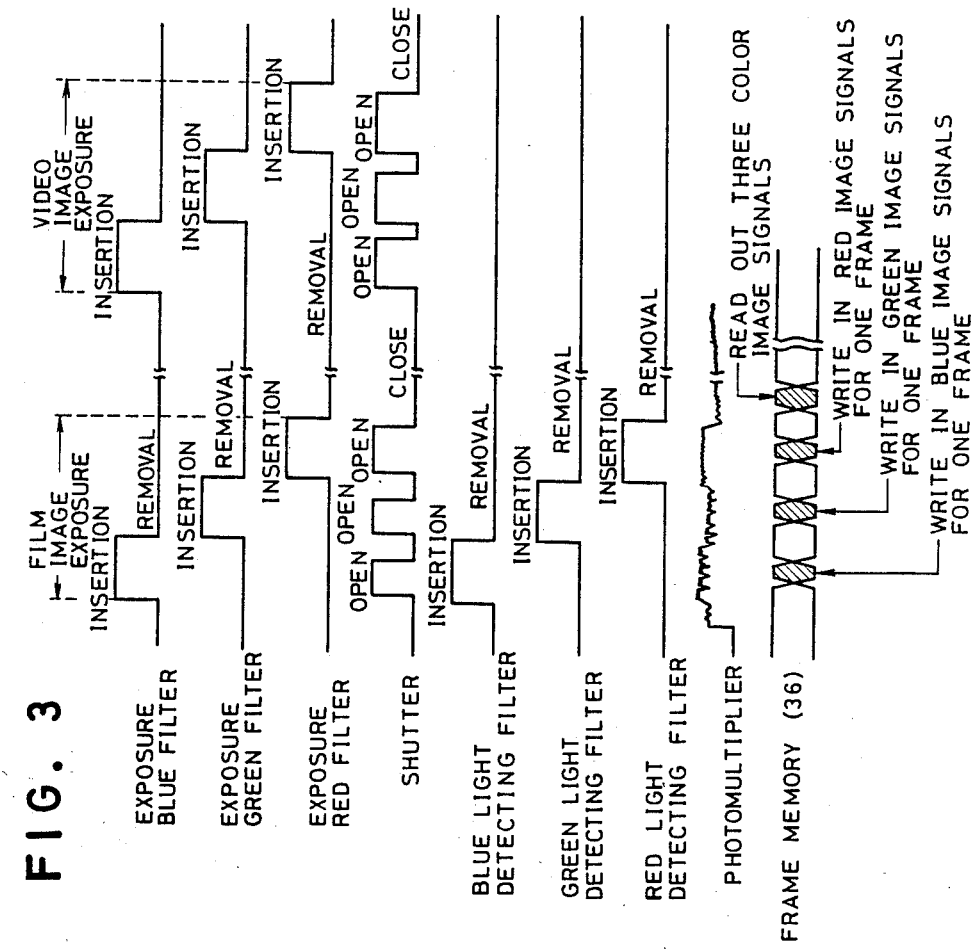
FIG. 3 is a time chart showing a printing operation sequence for film and video images.

FIG. 3 is useful for explaining the operation of the video printer shown in FIG. 1. After indicating a format of index print through the keyboard 42, the color negative film 11 is set in the negative carrier 10 and is pressed down by the framing mask 12.

The keyboard 42 is operated to start a printing operation, turning the lens turret 13 to place the printing lens 14a in the printing path 19. Simultaneously, the controller 35 controls the changeover switch 52 to connect the driver 53 to the constant voltage generator 51 to cause the black-and-white CRT 1 to emit light. Then, the blue filters 17 and 27 are inserted into the printing and image taking paths 19 and 24, respectively. Immediately after the insertion of the blue filters, the controller 35 controls the shutter controller to open the shutter 20 for a certain time period according to the density of the color negative film 11 for blue, forming a latent image for blue in the color photographic paper 2.

While forming the blue latent image on the color photographic paper 2, the light reflected by the half mirror 23 is directed to the photomultiplier tube 31 through the lenses 29 and 30 and the blue filter 27. The photomultiplier tube 31 transforms the blue light into time serial video signals which in turn are amplified by the amplifier 32 and then converted into a digital form by the A/D converter 33. The digital video signals are sent to a memory area of the frame memory 36 selected by the selector 34. Because the CRT controller 37 sends address signals corresponding to points on the screen of the CRT 1 where the flying spot scans to the frame memory 36, the frame memory 36 writes the digital video signals therein according to the address signals.

The blue filters 17 and 27 then are replaced with the green filters 16 and 26, respectively, at which time the shutter 20 opens for an appropriate time period according to the density of the color negative film 11 for green. During the opening of the shutter 20, the flying spot produced by the black-and-white CRT 1 scans the color negative film 11 so as to form a green color image over the blue color latent image on the color photographic paper 2. In the same way as for blue, the photomultiplier tube 31 receives the light reflected by the half mirror 23 through the lens 29 and 30 and the green filter 26 and transforms the light into time serial video signals. After having been subjected to analog-to-digital signal conversion in the A/D converter 33, the digital video signals are written in a memory area of the frame memory section 36 selected by the selector 34.

In the same way, digital video signals for red are written in an area of the frame memory section 36 selected by the selector 34, while a red color latent image is formed over the blue and green latent images on the color photographic paper 2. In such a way, a color image is formed in a three color frame sequential exposure. Thereafter, the color photographic paper 2 is advanced by one frame.

The three color video signals written in the frame memory section 36 are transmitted to the image processing section 39 through the bus line 38 so that each is image processed as a color, gradation correction and image size reduction being provided appropriately. After this image processing, the three color video signals are sent to the frame memory section 41 through the bus line 38 and are written in memory areas of the frame memory section 41 designated by the controller 35 by color. In accordance with the designation of memory areas where video signals are written in as composite video signals, various images are inlaid in the frame memory section 41 as a single composite image. After this inlaying of images, the controller 35 sends an instruction signal to the CRT controller 37 to read out the composite video signals from the frame memory section 41. The composite video signals are sent to the color monitor 46 through the negative-to-positive reversal circuit 43, the D/A converter 44, and the driver 45, and are displayed as a color composite image on the screen of the color monitor 46.

After printing of all of the frames of the color negative film 11, the inlaid arrangement of component images of an inlaid composite image with frame numbers 65 are displayed on the color monitor 46 for visual inspection. When printing the composite image to provide an index print, an instruction is entered through the keyboard 39 to select the video image printing mode after the removal of the film carrier 10 from the black-and-white CRT 1. Consequently, the lens turret 13 is turned to place the printing lens 14b in the printing path 19 and, simultaneously, the changeover switch 52 disconnects the driver 53 from the constant voltage generator 51 and connects it to the selector 49.

According to read out signals provided by the CRT controller 37, the three color video signals are read out from the frame memory section 41 and converted into digital form by the A/D converter 48. The selector 49 selectively transmits the digital video signals for. for example, blue, to the black-and-white CRT 1 through the driver 53 to repeatedly display the video signals of a blue negative image as a black-and-white image in a brightness pattern on the black-and-white CRT 1. During the display of the black-and-white image, the controller 35 causes the filter controller 18 to insert the blue filter 17 into the printing path 19 to transform the black-and-white image projected onto the color photographic paper 2 by the printing lens 14b into a blue image. Then, the controller 35 causes the shutter controller 21 to open the shutter 20 for an appropriate time period determined according to the sensitivity of the color photographic paper to blue, forming a blue latent image in the color photographic paper 2.

After an appropriate time period, the shutter 20 is closed and the blue filter 17 is replaced with the green filter 16. Simultaneously, the selector 49 selectively transmits the digital video signals for green to display the video signals as a black-and-white image in a brightness pattern on the black-and-white CRT 1. Thereafter, the controller 35 controls the shutter controller 21 to open the shutter 20 again for an appropriate time period in accordance with the sensitivity of the color photographic paper 2 to green, forming a green latent image over the blue latent image in the color photographic paper 2. In the same way, a red latent image is formed over the blue and green latent images in the color photographic paper 2. As a result, a composite color latent image, including color latent images of a plurality of frames of the color negative film 11, is formed as shown in FIG. 2. Thus, the video image printing mode is finished. This video image printing mode is conducted to form the composite image after every predetermined number of frames.

When a predetermined number of frames of the color negative film 11 and composite image frames are printed, the exposed color photographic paper 2 is cut into an exposed print strip by the cutter 5. The print strip is transported by the rollers 7 to the photographic processing section 6 to be developed. Thereafter, the print strip is cut by the cutter 8 into individual prints and is delivered into the tray 9.

Although in foregoing embodiment, the photographic printer is applied to make an index print including a plurality of different frames of a color negative film as an inlaid composite image, the photographic printer can be applied to make a print including a plurality of images of the same frame. The photographic printer can be used to make a print of a composite image of a color negative frame and a computer graphic image provided by a digitizer and/or characters entered through the keyboard. These images and characters may be electrically composed in the image processing section 39 and displayed on the black-and-white CRT 1 in the same manner as described above for printing. It should be noted that the reading of an image of the negative film 11 may be effected either before or after, or even during, the printing of the negative image.

Although the present invention has been fully described by way of a preferred embodiment thereof with reference to the accompanying drawings, it will be apparent to those skilled in the art that various changes and modifications of the embodiment are possible without departing from the scope of the invention.

What is claimed is:

1. A photographic printer comprising:
   a CRT for illuminating an original with a flying light spot for printing an image of a frame of said original on a photographic paper;
   a mirror for reflecting said flying light spot passed through said original;

light detecting means for detecting said reflected light to provide output signals for each frame of said original;

means for electrically composing said output signals of several frames as composite video image signals;

means for displaying said composite video image signals as an inlaid composite video image on said CRT, and means for projecting said composite video image from said CRT to a photographic paper so as to print said inlaid composite video image onto said photographic paper after removing said original.

2. A photographic printer as defined in claim 2 wherein said mirror comprises a half mirror disposed in a printing path between said CRT and said photographic paper.

3. A photographic printer as defined in claim 1, wherein said mirror is a total reflection mirror removably disposed in a printing path between said CRT and said photographic paper.

4. A photographic printer as defined in claim 1, wherein said inlaid composite video image includes frame numbers, each of said frame numbers corresponding to a respective frame.

5. A photographic printer as defined in claim 1, wherein said inlaid composite video image comprises a predetermined number of images arranged in a matrix.

6. A photographic printer as defined in claim 1, wherein said CRT comprises a black-and-white CRT on which a black-and-white image of said frame is displayed in a brightness pattern in accordance with color.

7. A photographic printer as defined in claim 6, further comprising three primary color filters, each being inserted into said printing path independently of the other two.

8. A photographic printer as defined in claim 7, wherein said three primary color filters comprise blue, green, and red filters respectively.

9. A photographic printer as defined in claim 6, further comprising three complementary color filters, each being inserted into said printing path independently of the other two.

10. A photographic printer as defined in claim 9, wherein said three complementary color filters comprise cyan, magenta, and yellow filters respectively.

11. A photographic printer as defined in claim 1, further comprising a color monitor for displaying a positive color image of said inlaid composite video image to be displayed on said CRT.

* * * * *